United States Patent [19]

Maehara

[11] Patent Number: 4,466,585
[45] Date of Patent: Aug. 21, 1984

[54] MAGNETIC RECORDING TAPE CARTRIDGE

[75] Inventor: Yoshimi Maehara, Kyoto, Japan

[73] Assignee: Hitachi Maxell, Ltd., Osaka, Japan

[21] Appl. No.: 404,717

[22] Filed: Aug. 3, 1982

[30] Foreign Application Priority Data

Aug. 8, 1981 [JP] Japan .................................. 56-117961

[51] Int. Cl.³ ...................... G11B 23/04; G11B 15/32; G03B 1/04
[52] U.S. Cl. .................................... 242/199; 206/391; 220/4 B; 360/132
[58] Field of Search ............... 242/197, 198, 199, 200; 206/389, 391; 360/132, 96.1, 96.2, 96.3, 96.4, 96.5, 96.6; 220/4 R, 4 B, 4 E, 327, 1 A

[56] References Cited

U.S. PATENT DOCUMENTS

| 3,884,430 | 5/1975 | Martin | 242/199 |
| 3,991,956 | 11/1976 | Machida | 242/199 |
| 4,076,186 | 2/1978 | Oishi et al. | 242/199 |
| 4,191,345 | 3/1980 | Sato et al. | 242/197 |
| 4,227,622 | 10/1980 | Okamura et al. | 242/197 X |
| 4,232,841 | 11/1980 | Hashimoto | 242/199 |
| 4,349,166 | 9/1982 | Tanaka et al. | 242/197 |

FOREIGN PATENT DOCUMENTS

| 2844168 | 4/1979 | Fed. Rep. of Germany | 242/197 |
| 2067514 | 7/1981 | United Kingdom | 242/197 |

Primary Examiner—Stuart S. Levy
Assistant Examiner—Scott J. Haugland
Attorney, Agent, or Firm—Birch, Stewart, Kolasch & Birch

[57] ABSTRACT

A magnetic recording tape cartridge comprising a bottom section and a top section assembled to the bottom section to provide a cartridge case. There are provided combinations of elongated holes in plan view and projections engageable in the elongated holes on both sections respectively to secure the bottom and top sections. Two of the securing combinations are specifically aligned and designed so as to eliminate horizontal displacement during assembly so that both sections can be easily joined in an accurate manner.

7 Claims, 16 Drawing Figures

MAGNETIC RECORDING TAPE CARTRIDGE

FIELD OF THE INVENTION

The present invention relates to a magnetic recording tape cartridge whose cartridge case is composed of a top section and a bottom section made of plastic resin material, and aims at reliably aligning connecting portions of the top section and the bottom section when the same are integrally connected with each other after mounting of inner components.

BACKGROUND OF THE INVENTION

FIG. 1 shows such a magnetic recording tape cartridge which comprises a cartridge case 1 composed of a top section 1a and a bottom section 1b, and after inner components are mounted into the bottom section 1b, the top section 1a and the bottom section 1b are integrally assembled together. In general, the top section 1a and the bottom section 1b are fastened together at four corners of the case and the front central portion of the cartridge case 1 by tapping screws. In substitution for the tapping screws, the top section 1a and the bottom section 1b may be connected with each other by an ultrasonic welding method.

When the top section 1a and the bottom section 1b are assembled together by the tapping screws, through-holes are formed in the bottom section 1b at connecting portions $P_1$, $P_2$, $P_3$, $P_4$ and $P_5$ while pins having screw receiving holes are formed in the top section 1a at the corresponding portions. At the respective connecting portions $P_1$ to $P_5$, the tapping screws are inserted into the receiving holes of the top section 1a through the through-holes of the bottom section 1b, and in a conventional magnetic recording tape cartridge, it has heretofore been troublesome to properly align the top section 1a and the bottom section 1b so that the through-hole and the receiving hole are vertically and coaxially in alignment with each other at each of the connecting portions.

That is, in a conventional magnetic recording tape cartridge, the top section 1a is apt to be connected to the bottom section 1b in a longitudinally or traversely shifted condition or in a horizontally rotated condition, and it takes time to correct such displacement.

Such displacement is caused not only by poor performance of assembling of the cartridge case, but depends on accuracy in forming of the top section 1a and the bottom section 1b. Unbalanced cooling distortion in case of plastic forming of the top section 1a and the bottom section 1b causes serious dimensional errors simultaneously in the longitudinal and traverse directions A and B in FIG. 2. It leads to dimensional changes in the direction C at each of the connecting portions at the four corners resulting in warped positional relationship between the top section 1a and the bottom section 1b in the direction C, and thus alignment in the connecting portions $P_2$ to $P_5$ at the corners of the cartridge case is further made difficult. Further, since the ends of the top section 1a and the bottom section 1b tend to be outwardly warped when being formed, the top section 1a and the bottom section 1b are liable to separate from each other at the connecting portions $P_2$ to $P_5$.

Such displacement between the top section 1a and the bottom section 1b causes not only inferior or unreliable connection at each of the connecting portions, but further causes vertical warp in various tape guide members such as a fixed guide pin 6, a fixed guide cylinder 5 or a freely rotatable guide roller 7 as shown in the drawings (see FIGS. 3–6). This is because the upper and lower ends of the guide pin 6 and the guide cylinder 5 are engaged with and fixed to the inner surfaces of the top section 1a and the bottom section 1b and the shaft 14 is integrally projected from the bottom section 1b, with the upper end of the shaft 14 being engaged with and fixed to the inner surface of the top section 1a. Such vertical warp of these tape guide members should be completely prevented since it naturally results in instable running of the magnetic recording tape.

SUMMARY OF THE INVENTION

An essential object of the present invention is to provide a magnetic recording tape cartridge which comprises a cartridge case wherein the top section can be easily and reliably aligned with the bottom section after the bottom section is fitted with necessary components during the process of manufacturing of the cartridge case, thereby enabling satisfactory connection of the top section and the bottom section in the next step by means such as by tapping screws or by an ultrasonic welding method.

According to the present invention, there is provided a magnetic recording tape cartridge which comprises a bottom section surrounded by peripheral walls, a top section surrounded by peripheral walls and assembled to the bottom section to provide a cartridge case having a chamber for the accommodation of various components including magnetic recording tape reels on which a magnetic recording tape is wound, a first combination of a first hole and a first projection engageable in the first hole, each of which is provided on the generally central portion of either of the bottom section or top section respectively and a series of second combinations, each combination having a second hole of an elongated shape in plan view with the apside of the second hole directed generally to the central portion of the cartridge case and a second projection engageable in the elongated hole, each of which is provided on one corner portion of the respective top section or bottom section alternatively.

DESCRIPTION OF A PREFERRED EMBODIMENT

Figure 1:
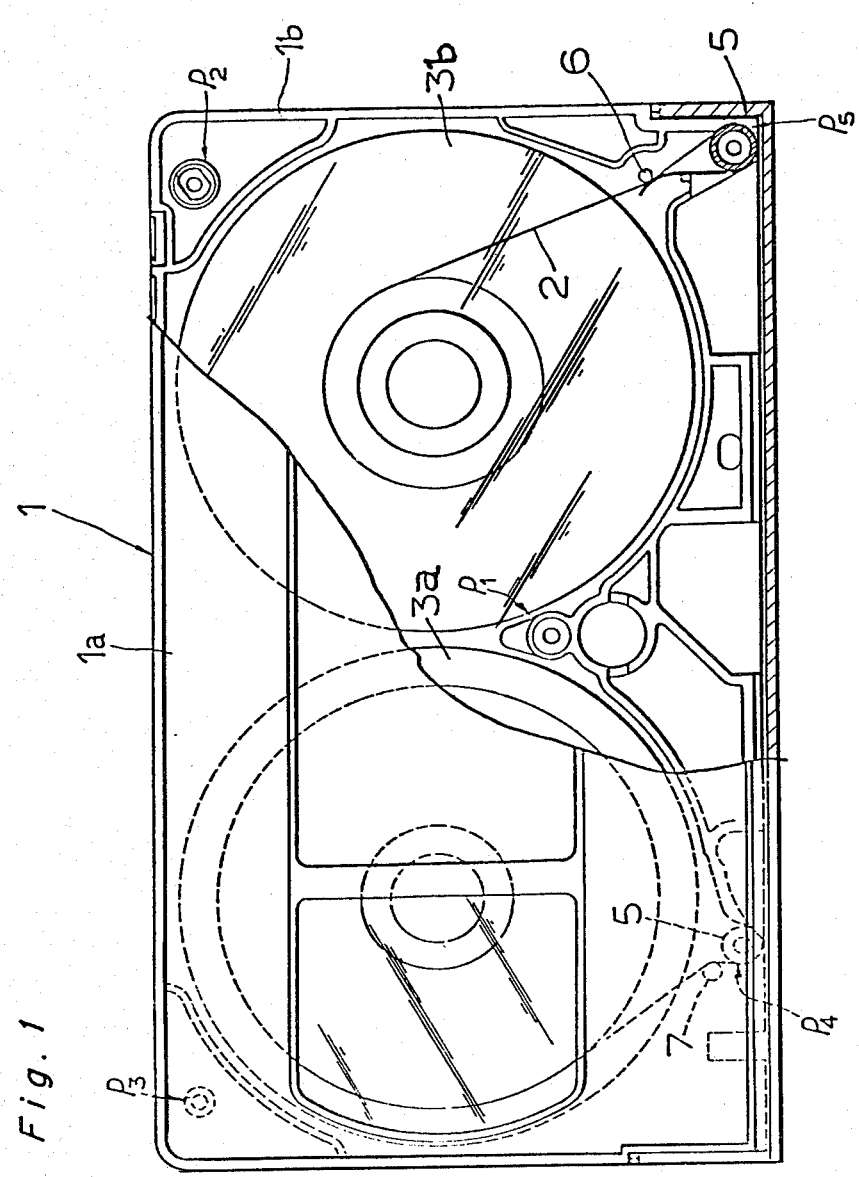
FIG. 1 is a top plan view of a magnetic recording tape cartridge in which the present invention is employed with a part of a top section broken.

Referring now to FIG. 1 of the drawings, there is shown a magnetic recording tape cartridge for use in a standard video tape player, which comprises a cartridge case 1 composed of a top section 1a and a bottom section 1b, each section being surrounded by peripheral walls with a predetermined height. Both sections 1a and 1b are made of a plastic resin and connected together by screws as hereinafter described in detail, and a pair of tape reels 3a, and 3b for winding a magnetic recording tape 2 are rotatably provided within the cartridge case 1 in alignment with through-holes 4 defined in the bottom section 1b (see FIG. 2). A pair of guide cylinders 5 made of metal are vertically projected from the bottom section 1b at the left and right front portions of the cartridge case 1, and a guide pin 6 made of metal is vertically projected from the bottom section 1b in a portion close to the right-side guide cylinder 5 and between the left-side guide cylinder 5 and the left-side tape reel 3a a guide roller 7 made of plastic is freely rotatably supported. The guide cylinders 5, the guide pin 6 and the guide roller 7 are all arranged in a vertical attitude and function respectively as tape guide members to guide the magnetic recording tape 2 in such a manner that the magnetic recording tape 2 is drawn out from one tape reel 3b and is taken up by the other tape reel 3a along the front face of the cartridge case 1.

In assembling of the magnetic recording tape cartridge, necessary components such as the tape reels 3a and 3b, the guide cylinders 5, the guide pin 6 and the guide roller 7 are mounted in the bottom section 1b, and then the top section 1a is placed on the bottom section 1b and the top section 1a and the bottom section 1b are connected together at the front central portion and four corners of the cartridge case 1 by tapping screws 9.

Figure 3:
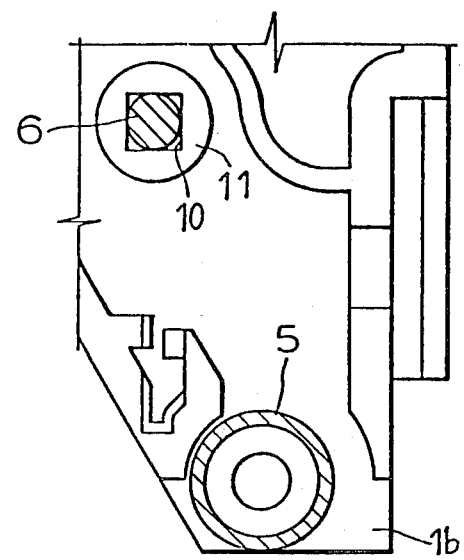
FIG. 3 is an enlarged top plan view showing arrangement of a guide cylinder and a guide pin.
Figure 4:
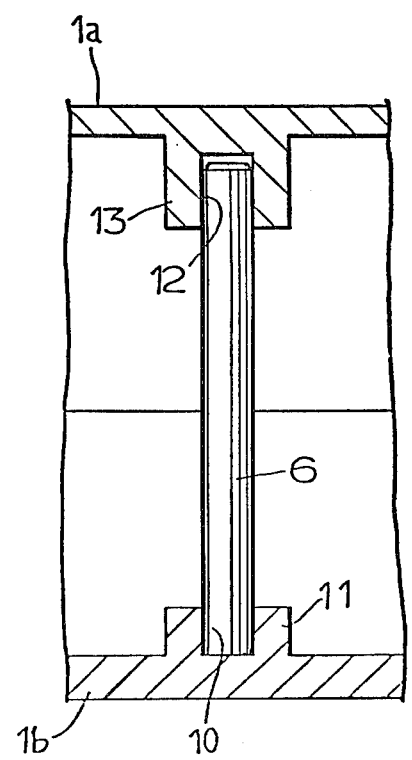
FIG. 4 is a vertical cross sectional view showing the guide pin.

At the portion where the guide pin 6 is arranged, as shown in FIGS. 3 and 4, a boss 11 with an engaging hole 10 of a square configuration in plan view is defined projecting upwardly from the inner surface of the bottom section 1b while another boss 13 with a hole 12 of a circular configuration in plan view is defined projecting downwardly from the inner surface of the top section 1a so that the lower surface of the guide pin 6 is engaged with the engaging hole 10 of the bottom section 1b and the circular hole 12 of the boss 11 of the top section 1a is engaged with the upper portion of the guide pin 6 upon assembling of the top section 1a and the bottom section 1b.

Figure 5:
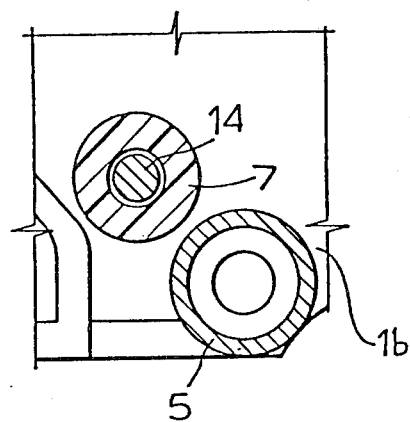
FIG. 5 is a top plan view showing arrangement of the guide cylinder and a guide roller.
Figure 6:
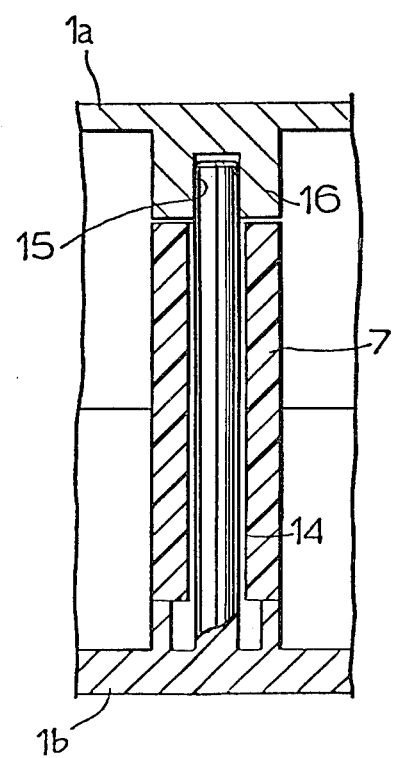
FIG. 6 is a vertical cross sectional view showing the guide roller.

Further, in the portion of the guide roller 7, as shown in FIGS. 5 and 6, a shaft 14 vertically projects from the inner surface of the bottom section 1b while a boss 16 having a hole 15 of a circular shape is provided on the inner surface of the top section 1a so that the guide roller 7 is freely rotatably engaged with and supported by the shaft 14 of the bottom section 1b and the circular hole 15 of the boss 16 of the top section 1a is engaged with the upper portion of the shaft 14 upon assembling of the top section 1a and the bottom section 1b.

The present invention is characterized by the construction of the connecting portion P₁ at the central portion of the cartridge case 1 and the connecting portion P₂ at the rear right-side corner of the cartridge case 1, and the remaining connecting portions P₃, P₄ and P₅ are substantially constructed in a known manner as hereinafter described in detail.

Figure 7:
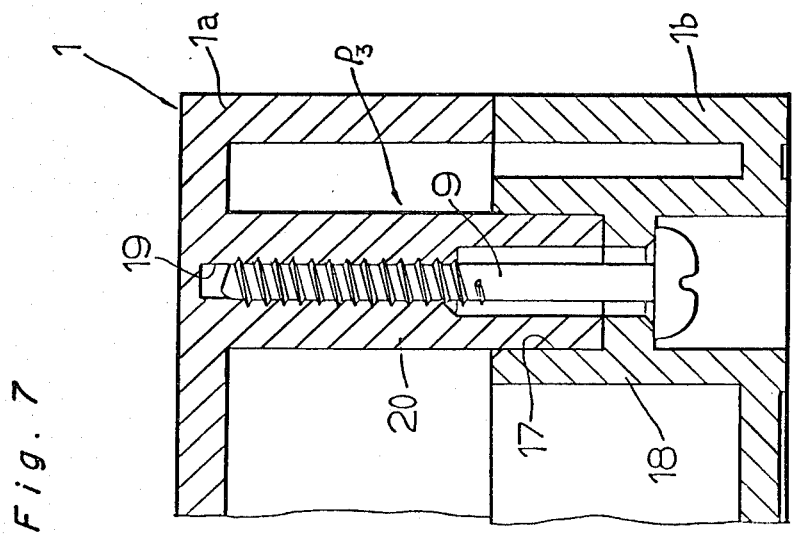
FIG. 7 is an enlarged cross sectional view taken at a portion marked $P_3$ in FIG. 1.

With respect to the connecting portion P₃ at the rear left-side corner of the cartridge case 1, as shown in FIG. 7, a boss 18 having a stepped through-hole 17 passing therethrough projects upwardly from the inner surface of the bottom section 1b while a circular column-like pin 20 having a screw receiving hole 19 projects downwardly from the inner surface of the top section 1a so that the pin 20 is engaged within the stepped through-hole 17 and the tapping screw 9 inserted into the stepped through-hole 17 from below the cartridge case 1 is engaged in the screw receiving hole 19 upon assembling of the top section 1a and the bottom section 1b.

Figure 8:
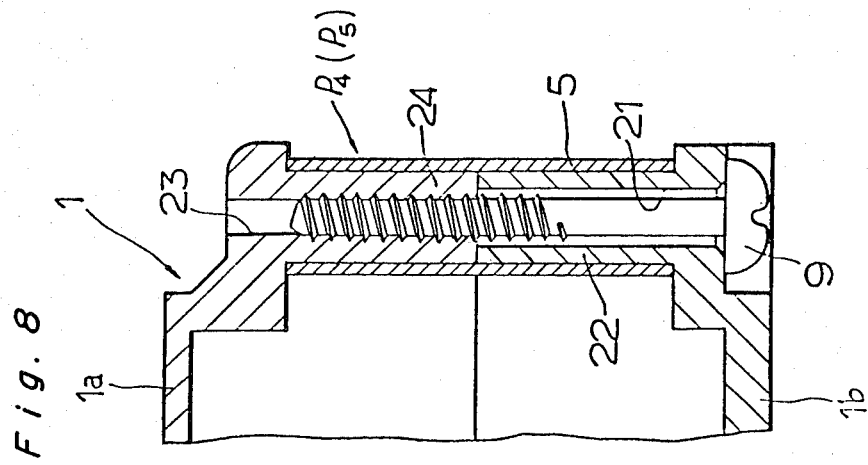
FIG. 8 is a cross sectional view taken at portions marked $P_4$ and $P_5$.

The connecting portions P₄ and P₅ at the left-side and right-side front corners respectively of the cartridge case 1 are identical with each other in construction, as shown in FIG. 8, a cylindrical boss 22 having a through-hole 21 passing therethrough is upwardly projected on the inner surface of the bottom section 1b while an annular boss 24 having a screw receiving hole 23 is provided on the inner surface of the top section 1a so that the cylindrical boss 22 and the annular boss 24 butt with each other upon assembling of the top section 1a and the bottom section 1b. The guide cylinder 5 is made of a metal pipe engages the outer peripheries of the bosses 22 and 24, a tapping screw 9 is inserted into the through-hole 21 from below the cartridge case 1 and into the screw receiving hole 23. In this condition, each of the guide cylinders 5 is fixed between the top section 1a and the bottom section 1b.

Figure 9:
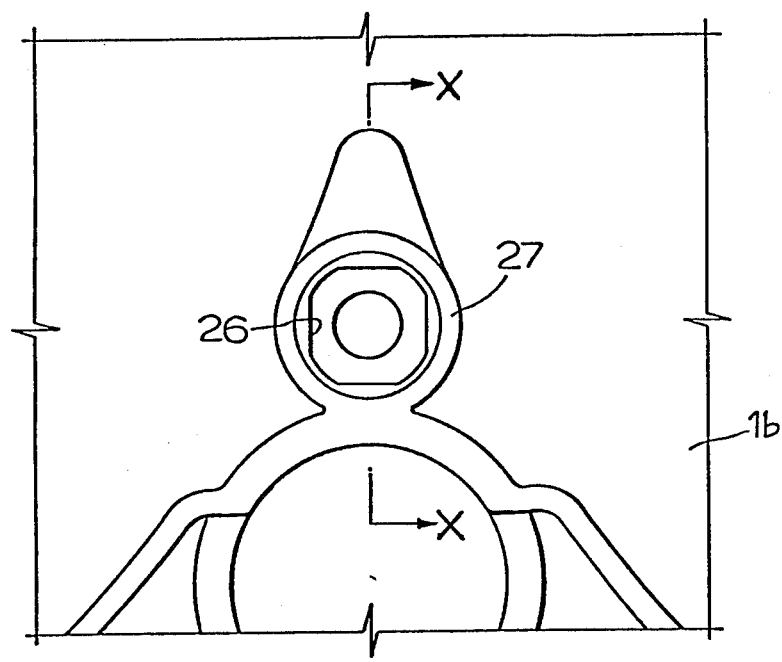
FIG. 9 is a top plan view of the bottom section showing the portion marked $P_1$ in FIG. 1.
Figure 10:
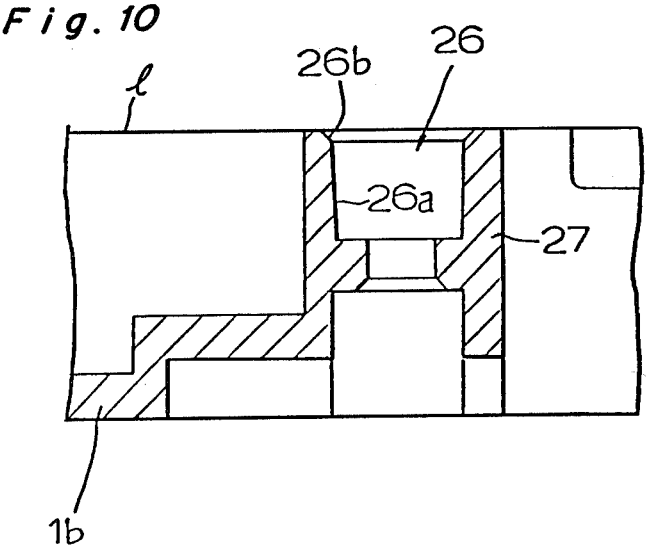
FIG. 10 is a cross sectional view taken along the line X—X in FIG. 9.
Figure 11:
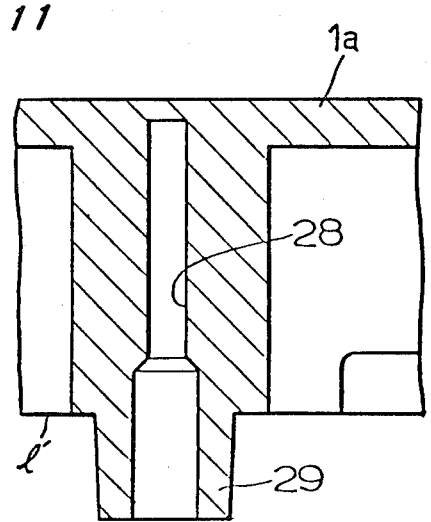
FIG. 11 is a vertical cross sectional view of the top section taken at the portion marked $P_1$ in FIG. 1.

With respect to the connecting portion P₁ at the front central portion of the cartridge case 1, as shown in FIGS. 9 and 10, a boss 27 having a stepped through-hole 26 passing therethrough is projected upward from the inner surface of the bottom section 1b. The boss 27 is so designed that the top end surface thereof is flush with the top surface 1 of the bottom section 1b while the through-hole 26 has a square shape in plan view with the inner peripheral side surface 26a of the upper portion of the hole being slanted inward in a downward tapered manner with the inner surface edge 26b of the upper opening being formed in a countersink manner as a slanted guide surface. As shown in FIG. 11, an annular pin 29 having a screw receiving hole 28 is integrally formed on the inner surface of the top section 1a so that a small diametrical portion at the lower portion of the annular pin 29 is projected longer than the bottom surface 1' of the peripheral wall of the top section 1a and is tapered so as to be received by the corresponding tapered portion of 26a of boss 27.

Figure 12:
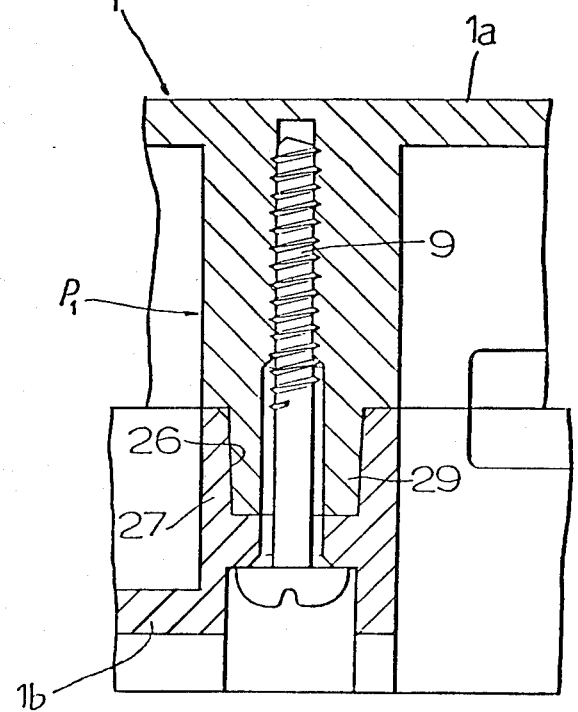
FIG. 12 is a vertical cross sectional view of the portion marked P₁ with the top section and the bottom section being connected with each other.

When the top section 1a and the bottom section 1b are assembled together, the small-diametrical lower end of the annular pin 29 in the top section 1a is smoothly guided into and engaged with the through-hole 26 since the through-hole 26 is square-shaped in section, so that the annular pin 29 is in contact with the inner peripheral surface 26a of the through-hole 26 at four points and is completely engaged with the through-hole 26 to form a close fit therewith, and the tapping screw 9 inserted into the through-hole 26 from below the cartridge case 1 is engagedly inserted into the screw receiving hole 28 (see FIG. 12).

Figure 13:
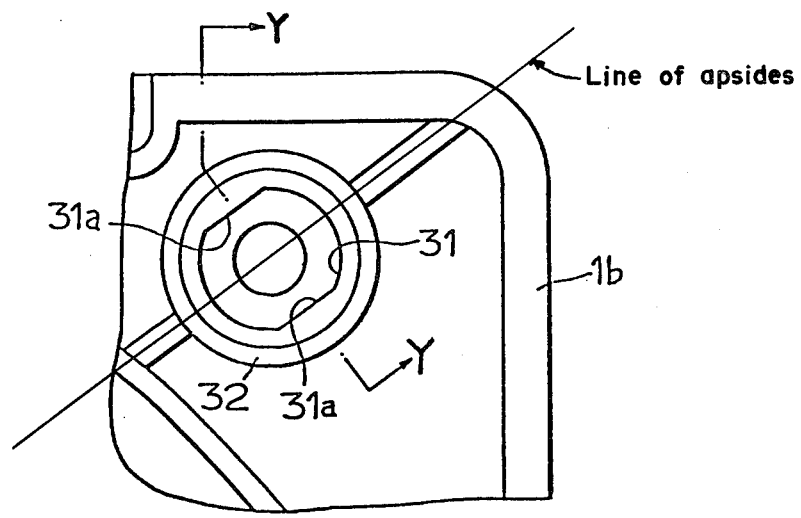
FIG. 13 is a top plan view of the bottom section showing the portion marked P₂ in FIG. 1.
Figure 14:
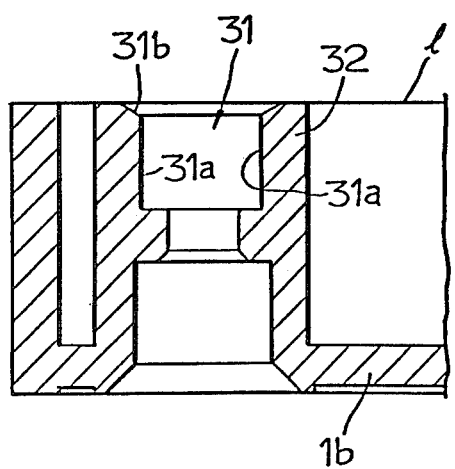
FIG. 14 is a cross sectional view taken along the line Y—Y in FIG. 13.
Figure 15:
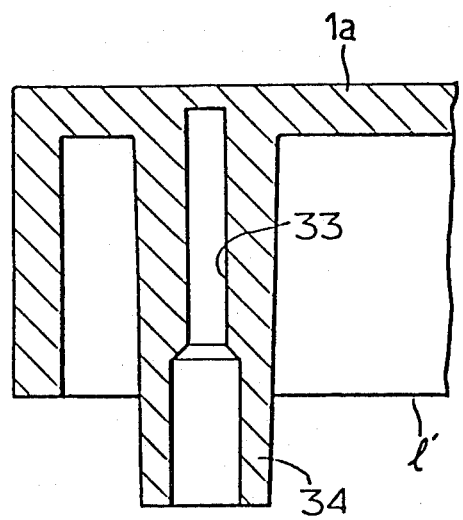
FIG. 15 is a vertical cross sectional view of the top section taken at the portion marked P₂ in FIG. 1.

With respect to the connecting portion $P_2$ at the rear right-side corner of the cartridge case 1, as shown in FIGS. 13 and 14, a boss 32 having a stepped through-hole 31 passing therethrough is projected upwardly from the inner surface of the bottom section 1b. The boss 32 is so designed that the upper end surface thereof is flush with the divisional line l of the bottom section 1a and the stepped through-hole 31 is formed in the form of a generally oval shape or an elongated hole with the upper portions 31b of at least a pair of parallel inner side surfaces 31a being formed as slanted guide surfaces in a countersink manner. The line of apsides or axis of the oval shaped hole 31 is substantially directed to the central portion of the cartridge case between $P_1$ and $P_2$ substantially parallel to the side surface 31a. On the other hand, as shown in FIG. 15, an annular pin 34 having a screw receiving hole 33 is integrally provided on the inner surface of the top section 1a with the lower end thereof projecting downward lower than the lower surface l' of the peripheral wall of the top section 1a.

Figure 16:
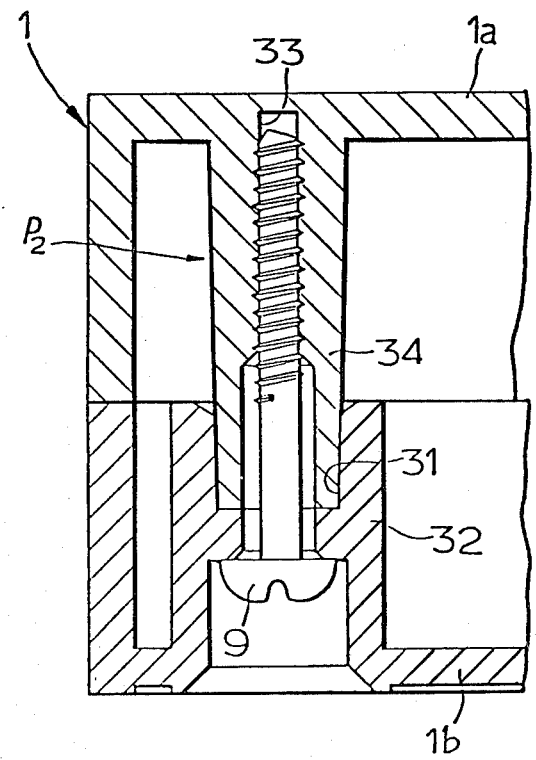
FIG. 16 is a vertical cross sectional view of the portion marked P₂ in FIG. 1 with the top section and the bottom section being connected with each other.

When the top section 1a and the bottom section 1b are assembled together, the annular pin 34 of the top section 1a is engaged with the elongated through-hole 31 to be in contact with the opposite inner side surfaces 31a at two points, and the tapping screw 9 inserted into the through-hole 31 from below the cartridge case 1 is engagedly inserted into the screw receiving hole 33 of the annular pin 34 (see FIG. 16).

The mutual relation between each of the connecting portions $P_1$ to $P_5$ constructed as above is as follows: When the top section 1a is assembled with the bottom section 1b, the annular pin 29 is guided to be engaged with the through-hole 26 at the first connecting portion $P_1$ in the central portion of the cartridge case 1 to prevent displacement of the top section 1a with respect to the bottom section 1b in the longitudinal direction A of the cartridge case 1 and the traverse direction B of the cartridge case 1. Then the annular pin 34 at the second connecting portion $P_2$ is guided to engage the elongated through-hole 31 to prevent displacement by horizontal rotation of the top section 1a in the direction indicated by an arrow D in FIG. 2 with respect to the bottom section 1b. In this case, even if the sizes of the top section and the bottom section are slightly different from each other by the aforementioned deformation in the direction C during molding, alignment of the top section 1a and the bottom section 1b at the connecting portions $P_1$ and $P_2$ may easily and reliably be achieved since the annular pin 34 at the connecting portion $P_2$ is displaced along the line of apsides of the elongated through-hole 31 to be closely engaged therewith, thereby automatically aligning the top section 1a and the bottom section 1b at the remaining connecting portions $P_3$, $P_4$ and $P_5$. Thus, the top section 1a and the bottom section 1b can be assembled together simultaneously at the connecting portions $P_1$ to $P_5$ by the tapping screws 9 without any hindrance.

The scope of the present invention is not limited to that of the aforementioned embodiment as shown in the drawings. For example, the magnetic recording tape cartridge which is an object of the present invention may be replaced by other types of video tape cartridges and/or Philips type magnetic recording tape cartridge.

Further, depending on the type of the magnetic recording tape cartridge, the top section 1a and the bottom section 1b may be assembled together at positions corresponding to three connecting portions $P_1$, $P_2$ and $P_3$ alone.

With respect to the connecting portion $P_1$ at the central portion of the cartridge case 1, the top section 1a and the bottom section 1b may be connected together by aligning engagement of the through-hole 26 and the pin 29, omitting the tapping screw 9. This engagement may be smoothly performed by forming one of the through-hole 26 and the pin 29 square-shaped and forming the other annular-shaped, though, both of the through-hole 26 and the pin 29 may be annular-shaped. The square form may be replaced by a rectangular form, such that the annular pin is conveniently in point contact with the square through-hole.

It is important that the top section 1a and the bottom section 1b may be connected with each other by an ultrasonic welding method.

Figure 2:
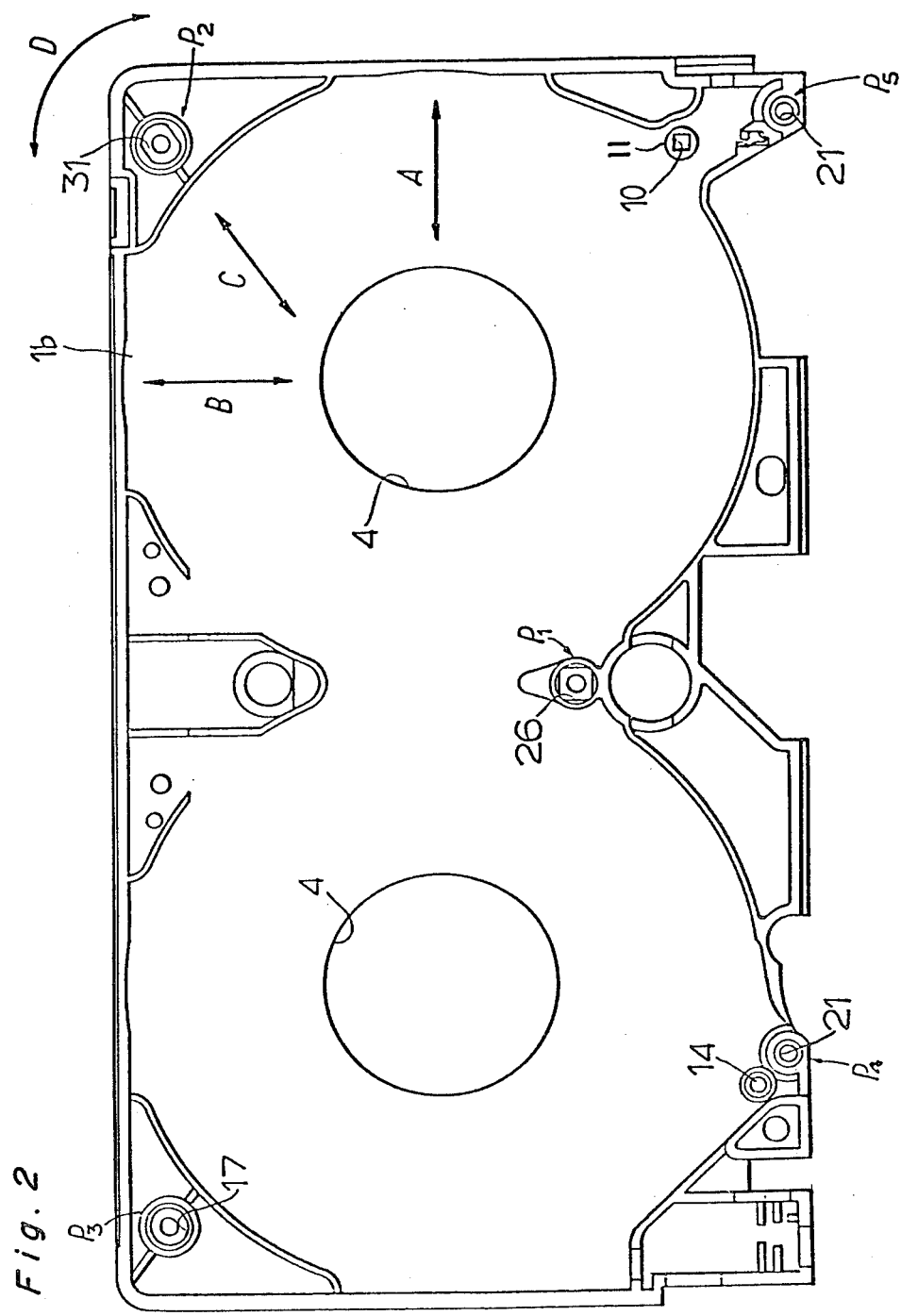
FIG. 2 is a top plan view of the magnetic recording tape cartridge with the top section being removed.

The line of apsides of the elongated through-hole 31 may be formed toward the center of the drive shaft insertion hole 4 in the right-hand side of FIG. 2, so long as it is formed substantially along the direction C in FIG. 2.

As hereinabove described, when the top section 1a and the bottom section 1b of the cartridge case 1 are to be assembled together, relative displacement of the top section 1a and the bottom section 1b in the longitudinal direction A and the traverse direction B by engagement of the hole 26 at the central connecting portion $P_1$ and the pin 29, and then the relative displacement of the top section 1a and the bottom section 1b in a horizontal direction D is prevented by engagement of the elongated through-hole 31 and the annular pin 34 at the connecting portion $P_2$ in one corner of the cartridge case 1. In particular, since the line of apsides of the elongated through-hole 31 is formed substantially toward the central portion of the cartridge case 1 and the annular pin 34 is in contact with the parallel opposite inner surfaces 31a of the elongated through-hole 31 to restrict relative horizontal rotation of the top section 1a and the bottom section 1b, the annular pin 34 can be smoothly guided into and engaged with the elongated through-hole 31 even if sizes of the top section 1a and the bottom section 1b are deformed in the direction C during plastic forming. Therefore, by virtue of engagement of the two connecting portions $P_1$ and $P_2$, the top section 1a and the bottom section 1B can be automatically aligned at the remaining connecting portions $P_3$, $P_4$ and $P_5$, leading to easy and accurate alignment of the top section 1a and the bottom section 1b. Consequently, various kinds of tape guide members can be satisfactorily kept in a vertical attitude to ensure stable running of the magnetic recording tape.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording tape cartridge which comprises in combination:
   a bottom section surrounded by peripheral walls and a top section surrounded by peripheral walls assembled together to provide a cartridge case having a chamber for accommodating various components including magnetic recording tape reels on which a magnetic tape is wound;

a first connecting combination of a first hole and a first projection having a lower end portion engagable in said first hole provided at generally the central portion of said cartridge case in one of said bottom and top sections respectively, and a series of second combinations of connecting members formed at the respective corners of said cartridge case, at least one of said second combinations comprising a stepped through-hole generally oval or elongated in shape having inner side surfaces substantially parallel, in one of said bottom and top sections, and a projection member for engaging said stepped through-hole, in the other of said bottom and top sections, such that an axis of said hole which runs parallel to said side surfaces is directed generally at said central portion of said cartridge case.

2. The magnetic recording tape cartridge according to claim 1, wherein said first hole is formed on said bottom section.

3. The magnetic recording tape cartridge according to claim 2, wherein said first hole is defined by surfaces generally square in shape in plan view.

4. The magnetic recording tape cartridge according to claim 3, wherein said inner side surfaces of said stepped through-hole are generally slanted.

5. The magnetic recording tape cartridge according to claim 1, wherein said stepped through-hole is defined in a projection formed on said bottom section.

6. The magnetic recording tape cartridge according to claim 3, wherein a boss defining said first hole on said bottom section has a height equal to the height of the peripheral walls of said bottom section, and said first projection is formed on said top section and has a length longer than the height of the peripheral walls of said top section so that said lower end portion of said projection can be inserted in said first hole.

7. The magnetic recording tape cartridge according to claim 6, wherein said first projection has a circular shape in plan view.

* * * * *